United States Patent
Kadri

[15] 3,660,749
[45] May 2, 1972

[54] DC TO DC CONVERTER WITH VOLTAGE REGULATION THROUGH PULSE WIDTH MODULATION BY CONTROL OF THE DISTRIBUTION OF FLUX VARIATIONS IN A DUAL CORE TRANSFORMER

[72] Inventor: Fred Vassaf Kadri, Madison, N.J.

[73] Assignee: Bell Telephone Laboratories, Incorporated, Murray Hill, N.J.

[22] Filed: Mar. 25, 1971

[21] Appl. No.: 127,923

[52] U.S. Cl. .................................321/2, 321/18, 321/45 R, 331/113 A
[51] Int. Cl. .................................................................H02m 3/22
[58] Field of Search.......................321/2, 18, 45; 331/113 A

[56] References Cited

UNITED STATES PATENTS

| | | | |
|---|---|---|---|
| 2,586,657 | 2/1952 | Holt, Jr. | 323/56 X |
| 2,686,290 | 8/1954 | Macklem | 323/50 |
| 3,361,952 | 1/1968 | Bishop | 321/45 R |
| 3,383,582 | 5/1968 | Bishop et al. | 321/18 |
| 3,403,319 | 9/1968 | Tate | 321/18 |
| 3,408,553 | 10/1968 | Bishop | 321/18 X |
| 3,473,104 | 10/1969 | Tate | 321/45 R |
| 3,525,035 | 8/1970 | Kakalec | 323/61 |

Primary Examiner—William M. Shoop, Jr.
Attorney—R. J. Guenther and E. W. Adams, Jr.

[57] ABSTRACT

A DC to DC converter regulates its voltage output by controlling the distribution of flux variations in a dual core transformer included in the converter's inverter circuit. The inverter output is coupled to a rectifier and the output load, via one core of the transformer. A voltage regulation control circuit includes the other core of the transformer and pulse width modulates the inverter output by controlling the flux variations in the two cores of the transformer. The second core included in the voltage regulation control circuit advantageously permits complete isolation between the input and output circuits of the converter.

7 Claims, 4 Drawing Figures

Patented May 2, 1972

INVENTOR
F. V. KADRI
BY Alfred Steinmetz
ATTORNEY

DC TO DC CONVERTER WITH VOLTAGE REGULATION THROUGH PULSE WIDTH MODULATION BY CONTROL OF THE DISTRIBUTION OF FLUX VARIATIONS IN A DUAL CORE TRANSFORMER

BACKGROUND OF THE INVENTION

This invention relates to converter systems and is more particularly concerned with the regulation of the output voltage of a converter. It is specifically concerned with the voltage regulation of a converter by pulse width modulation.

A free-running DC to DC converter is a highly efficient and economical way of converting voltage from one potential level to another potential level. The chief disadvantage of a free-running converter is its poor inherent voltage regulation characteristics. The disadvantage of the poor inherent regulation may be readily corrected by inserting a series regulator between the converter output and the load. This solution, however, requires a separate circuit package which dissipates part of the converter's power output and reduces efficiency. An alternate solution to the problem of the converter's poor inherent regulation is to combine both the converter and a voltage regulator in a single stage circuit. The voltage output of the converter may be regulated by controlling the duty cycle of the inverter switching devices included in the converter in response to a feedback signal supplied by a voltage regulation control circuit. For safety purposes, the feedback path of a voltage regulation control circuit should have complete isolation between the input power source and the output load circuits to protect the converter against disturbances and faults in the output load circuit. The voltage regulation circuitry of the DC to DC converter may become large and unwieldly because of the circuit arrangement to secure isolation between the converter's input and output. For example, isolation is normally provided by including an independent transformer stage in the feedback path of the voltage regulation circuit of the converter. This greatly adds to the weight and expense of the converter.

The voltage regulation of a converter by controlling the duty cycle of the inverter switching devices may be accomplished by modulating the pulse width of the driving signal applied to those switching devices. This modulation must be synchronized with the switching action of the converter's inverter and in the case of push-pull type inverters the modulation control must operate in response to successive half-cycles of the inverter output having opposite signal polarities. This may necessitate separate modulation control circuits to respond to each half-cycle of the inverter output.

It is therefore an object of the invention to isolate the input and output circuits of a voltage regulated DC to DC converter without the necessity of adding additional transformers.

It is another object of the invention to simplify the voltage regulation feedback circuitry by combining the regulation and isolation functions in a single transformer unit.

It is yet another object of the invention to regulate the voltage output of a DC to DC converter without the necessity for the voltage regulation circuitry to respond to opposite polarities of the converter's inverter output.

SUMMARY OF THE INVENTION

A DC to DC converter in accord with the above objects regulates its output by controlling the distribution of flux variations in its inverter output transformer by a control transformer core coupled to the inverter transformer primary winding and responsive to a voltage regulation feedback circuit. The primary winding is wound to encircle two independent transformer cores. The output winding is wound to encircle the output or first core. A control winding is wound to encircle the second or control core. A secondary winding wound to encircle both cores applies the unregulated inverter output to a pulse delay circuit which delays the pulse output signal in response to the voltage regulation circuit which includes a voltage error detector coupled to the voltage across the output winding. The output of the pulse delay circuit activates a switch which shorts the normally open circuited control winding. This shorting action pulse width modulates the inverter pulse output voltage appearing across the output winding.

The voltage regulation circuit of the converter is significantly simplified by operating the converter so that at least the control transformer core is saturated for a portion of alternate half-cycles of the inverter output. This permits the feedback control to fully control the output voltage by being operative only during alternate half-cycles of the inverter switching. This greatly simplifies the voltage regulation circuitry.

A starting circuit included in the converter advantageously permits the starting of the converter and automatic restarting should a short circuit across the load occur. Once the converter is operative, the starting circuit is deactivated.

BRIEF DESCRIPTION OF THE DRAWINGS

The construction and operation of the invention may be readily understood by reference to the following specification and the appended drawings in which.

DETAILED DESCRIPTION

Figure 1:
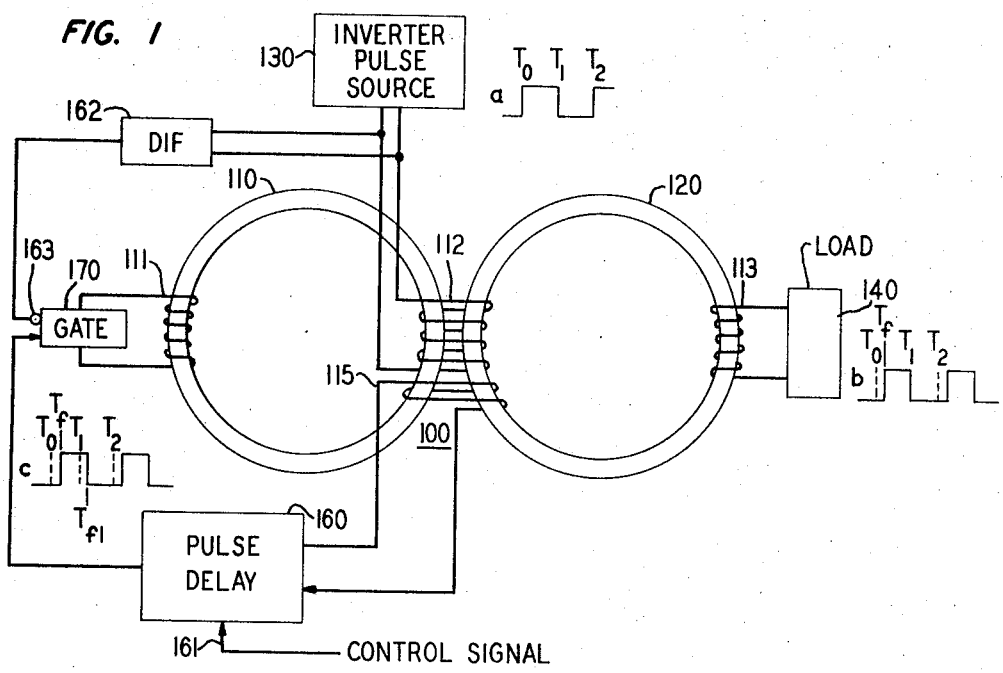
FIG. 1 is a block diagram of a pulse width modulation circuit utilizing flux distribution control in a dual core transformer to modulate a pulse signal.

The pulse width modulation circuit shown in FIG. 1 uses a dual core transformer to modulate the inverter output pulse. The two-core transformer 100 comprises the two independent toroidal cores 110 and 120. The inverter pulse source 130 is connected to both cores by the primary winding 112 which encircles both the cores 110 and 120. The inverter pulse source generates a series of pulse signals in the primary winding 112 which are shown by the adjacent waveform a. The inverter pulse source 130 may comprise any pulse generator capable of driving the inductive primary winding 112. The load 140 is connected to the secondary or output winding 113 encircling the core 120. The resultant output pulse signal applied to the load 140 is designated by the adjacent waveform b.

A gate circuit 170 shunts the control winding 111 which is wound about core 110, and is used to periodically short this winding, as described below. A winding 115, encircling both cores 110 and 120, applies a pulse signal derived from the output of the pulse source 130 to the pulse delay circuit 160. The pulse delay circuit 160 delays the pulse output of winding 115 in response to a control signal applied to input lead 161. The leading edge of the delayed pulse output of the pulse delay circuit 160, as shown by adjacent waveform c, is utilized to close the gate 170 and short the winding 112.

In operation the inverter pulse source 130 continuously applies a periodic pulse signal to the primary winding 112. Initially at time $T_0$ the gate 170 is not conducting and winding 111 is open circuited. Since the winding 111 is open circuited, the magnetic flux excursion in core 110 generates the necessary counter emf in winding 112. At this time $T_0$, the core 120 is burdened by the load connected across the output winding 113 and no flux variations occur within core 120. At some period of time $T_f$ determined by the control signal applied via lead 161 to the pulse delay circuit 160; the delayed pulse signal derived from winding 115 is applied to the gate 170. The leading edge of this delayed pulse signal closes the gate 170 which in turn short circuits the winding 111. With the winding 111 short circuited, the magnetic flux in the core 110 can no longer vary due to the current in winding 111. The required flux excursion to generate the counter emf now occurs in the core 120. The flux excursion in the core 120 induces the modulated pulse voltage in the output winding 113 (waveform b) which energizes the load 140.

At time $T_1$ the output of the inverter pulse source 130 reverses polarity. The inverter pulse output is connected to a differentiator 162 which generates a short pulse signal in response to each change in polarity to its input signal. This short pulse is applied to an inhibit input 163 of gate 170 to open the gate 170 and hence open circuit the winding 111. Gate 170 remains open until closed by the leading edge of the delayed pulse output of the pulse delay circuit 160. Those skilled in logic circuitry can readily devise the gating circuitry to perform this function in response to alternate polarity control signals. The operation of the pulse modulator is identical to that of the preceding half-cycle. At time $T_n$ the leading edge of the pulse output of the pulse delay circuit 160 activates and closes the gate 170 and the aforedescribed regulation cycle is repeated.

As indicated above, the pulse modulation control circuitry need only be operative during alternate half-cycles if the core 110 is saturated during the intervening half-cycles. The simplification in the control circuitry realized due to this mode of operation will be readily apparent by examining the description of the DC to DC converter described below and disclosed in FIG. 2.

Figure 2:
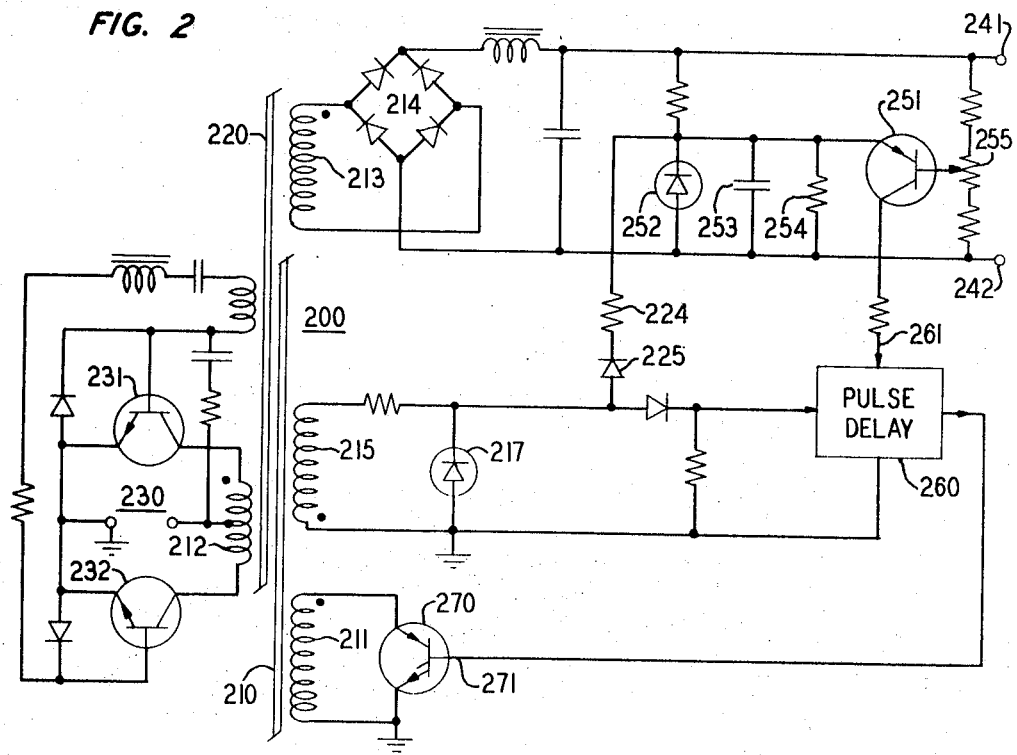
FIG. 2 is a schematic of a DC to DC converter with a feedback network to modulate the pulse output of the converter's inverter by controlling the flux distribution in a dual core transformer.
Figure 3:
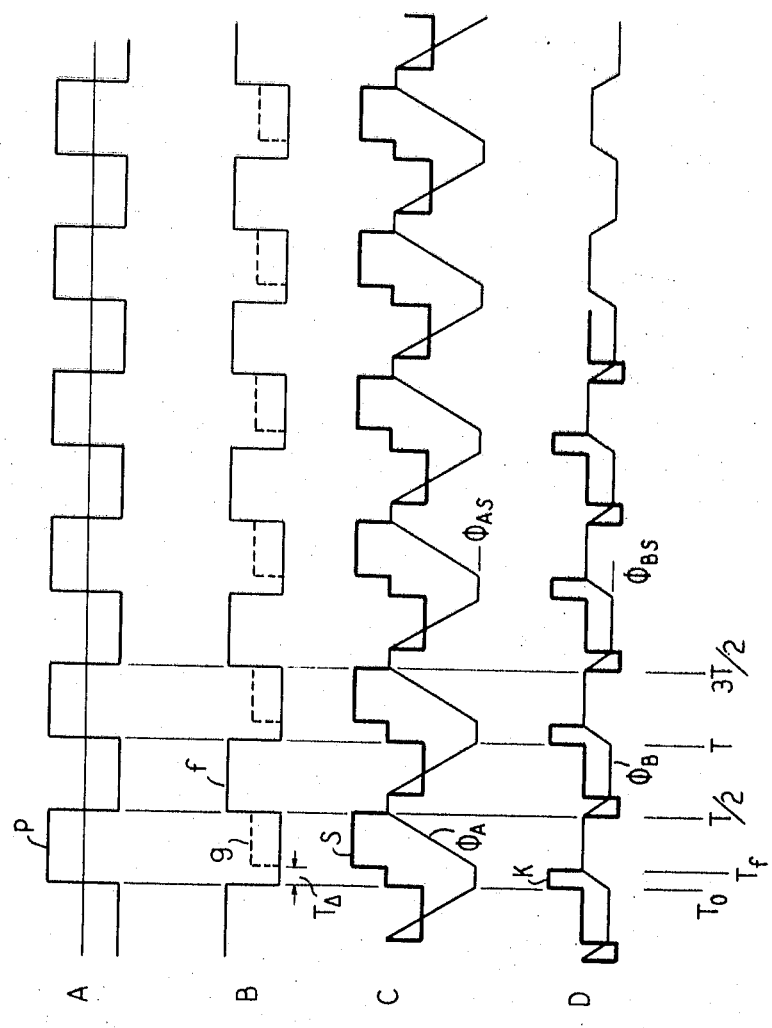
FIG. 3 shows the waveforms of the timing signals and voltage wave shapes to assist in understanding the operation of the converter disclosed in FIG. 2.

A schematic of a voltage regulated DC to DC converter utilizing a dual core transformer pulse width modulator is disclosed in FIG. 2. This DC to DC converter comprises an inverter circuit 230, a dual core transformer 200 comprising the separate and independent toroidal cores 210 and 220, a rectifier 214 and a feedback network to regulate the output voltage, including a pulse delay circuit 260 and a silicon controlled rectifier gate 270. Waveforms depicting the converter voltages are shown in FIG. 3 to assist in explaining its operation.

The inverter circuit 230 comprises two switching transistors 231 and 232 which alternately conduct to generate a square-wave voltage in the transformer primary winding 212. The primary winding 212 encircles two independent transformer cores 210 and 220. The secondary or output winding 213 is wound on the core 220 alone. A control winding 211 is wound on core 210 alone. The inverter 230 operates in the same manner and is identical to conventional inverters known in the art and it is not believed necessary to describe its switching operation in detail.

The coils encircling the two transformer cores 210 and 220 are designed so that the flux excursions within the cores will not traverse the major hysteresis loop but will saturate only at one end of the magnetization curve. The coil of winding 212 has a large number of turns so the input voltage cannot cause a major flux excursion. For example, in the case of a square wave input voltage, the number of turns is defined by the following inequality:

$$N > (E_{max} \cdot T)/(4B_m A_c)$$

where
$N$ = number of turns of the winding
$T$ = time period of applied square wave voltage
$E_{max}$ = max value of applied square wave voltage
$A_c$ = core cross section of core
$B_m$ = max flux density of core.

It is desirable that both cores 210 and 220 have equal width hysteresis loops and be constructed of square loop type core material. The core 210 must have a sufficient volt-time capacity to support the maximum input voltage. The core 220 must have a sufficient volt-time capacity to support the input voltage pulse delay time product. To permit the operation of the converter into a shorted load the volt-time capacity of both cores 210 and 220 must be identical.

The square wave voltage generated by the inverter circuit in the primary winding 212 is shown as waveform P in FIG. 3A. It is understood that the use of a generated square wave in the converter is merely illustrative and that many other periodic waveforms such as a sinusoidal waveform would be equally suitable for the purposes of the invention. For the purposes of explaining the operation of the invention, it is assumed that the converter has been operating for some time and that the two cores 210 and 220 saturate in a negative direction. While the invention is described in terms of both the cores 210 and 220 saturating, it is apparent to those skilled in the art that the simplification in the control circuitry can be achieved by having the core 210 alone saturate. The operation will be described starting at time $T_0$ at which the inverter has just generated a positive square wave. The dot notation shown adjacent to the windings of the two core transformer 200 indicates the corresponding voltages of like polarity of the windings. The dot notation is well known to those skilled in the art and it is not believed necessary to describe it in detail.

Initially at time $T_0$, the transformer windings are positive at the dot. The silicon controlled rectifier 270 shunting the control winding 211 is forward biased but not conducting. The load connected across output terminals 241 and 242 allows current to flow in windings 213 and places a sufficient burden on coil 213 so that no flux excursion occurs in the core 220. Hence all the flux excursion necessary to generate the counter emf in the primary winding occurs in the open circuited core 211. This flux excursion rises positively from the negative saturation level of transformer core 210. This flux excursion is shown by waveform $\Phi_B$ in FIG. 3D just subsequent to time $T_0$. Consequently at this period, the output voltage across the secondary winding 213, as shown by waveform s in FIG. 3C, is zero. The output voltage across the control winding 211, as shown by waveform k in FIG. 3D, is proportional to the inverter voltage applied to winding 212. The proportionality is determined by the turns ratio between the primary winding 212 and the control winding 211.

A feedback winding 215 is wound to encircle both cores 210 and 220. A square wave voltage shown by waveform f in FIG. 3B appears across winding 215 in response to the voltage generated by the inverter circuit 230. The transformer winding 215 has relatively few turns as compared with the winding 212 and is wound in an opposite direction so that the voltage across the winding 215 is an inverted attenuated version of the primary voltage.

The voltage pulse output across the winding 215 is clipped by the voltage breakdown diode 277 and applied to an adjustable pulse delay circuit 260. The pulse delay circuit 260 generates a delayed pulse signal of opposite polarity from the input pulse in accord with a control signal supplied to it by the voltage error detector transistor 251. Variable pulse delay circuits are well known in the art and are readily available commercially as a prepackaged unit. One particular prepackaged pulse delay circuit suitable to be adapted for use in the present invention is the 1AE PULSE DELAY TIMING CIRCUIT manufactured by the Western Electric Company. This circuit comprises a DTL pulse delay timing circuit that provides a delayed output of an opposite polarity from the input pulse having the delay determined by an external control signal. The 1AE PULSE DELAY TIMING CIRCUIT is described in the Western Electric Company's Integrated Circuit Data Sheet of October 1970 describing DTL logic circuits. A copy of this is available from Western Electric Company, Application Engineering Group, Dept. 2131, 555 Union Boulevard, Allentown, Penna. 18103. While a particular pulse delay timing circuit suitable for use in the invention has been described, equivalent circuits may be readily substituted without departing from the spirit and scope of the invention.

The voltage error detector comprises a transistor 251, and a voltage breakdown diode 252 to derive a reference voltage. The base electrode of the transistor 251 is connected to a voltage divider 255 which shunts the output terminals 241 and 242. Its emitter electrode is connected to the voltage breakdown diode 252.

The transistor 251 compares a portion of the DC output voltage derived from the voltage divider 255 against the reference voltage established by the breakdown diode 252.

The conductivity of transistor 251 is directly proportional to this comparison. The collector emitter path of transistor 251 is a controlled impedance coupling current from the rectifier 214 to the control input 261 of the pulse delay circuit 260. A specific magnitude of control current applied to the pulse delay circuit 260 delays the pulse output of winding 215 for a specific time duration designated $T_\Delta$ in FIG. 3B. This delayed pulse, shown as waveform $f$ in FIG. 3B, is applied to the control electrode 271 of the silicon controlled rectifier 270 shunting winding 211. This delayed pulse signal triggers the forward biased silicon controlled rectifier 270 into conduction at time $T_f$ shorting the control winding 211 and reducing the voltage across it to zero. As described above, an output voltage shown by waveform $s$ in FIG. 3C now appears across the output winding 213.

As described above, the two cores 210 and 220 are controlled so that the induced flux excursions in one direction will cause the two cores to saturate. This permits considerable simplification in the feedback circuitry necessary to regulate the output voltage. Each of the two transformer cores 210 and 220 is selected in relation to the core windings to have an excess of volt-time product capacity so that the flux excursions in each core will define a minor magnetization loop. Once steady state operation is established, the application of the above described short circuit control to achieve regulation control during one half-cycle will induce the appropriate flux excursions in the core 210 to saturate it in the proper direction of saturation which, in the illustrative example, is the negative saturation level. Should the core 210 attempt to saturate in the wrong direction which, in the present case, is the positive direction, the excess of the volt-time product absorbed by the core 210 during the negative half-cycle will gradually shift the flux excursion loop to the negative saturation level. Once this shift is completed full regulation of the output voltage of the converter is established.

The operation of the converter is described herein with both the cores 210 and 220 saturating in the same direction which, in the illustrative embodiment, is the negative direction. Under actual operating practices, the core 220 may saturate in a direction opposite to that of core 210. The direction of saturation in core 220 is not critical and, as is apparent to those skilled in the art, the converter will continue to operate and generate a regulated output voltage.

At the time T/2, as shown in FIG. 3, the inverter output (waveform P) changes polarity. The negative voltage across winding 211 (waveform K) turns off the silicon controlled rectifier 270 and creates an open circuit across the winding 211. Consequently a flux change is generated in core 210 in a negative direction (waveform $\Phi_B$) and no flux change occurs in core 220 (waveform $\Phi_A$). The flux change in core 210 proceeds negatively until the negative saturation level $\Phi_{BS}$ is reached.

With the core 210 saturated the flux excursion due to the inverter output takes place in core 220. The flux in core 220 (waveform $\Phi_A$) continues to increase in a negative direction in core 220 until the saturation level $\Phi_{AS}$ is reached at time T whereupon the inverter output changes state and the subsequent half-cycle of regulation begins.

The specific operation of the feedback circuitry to regulate the voltage may be readily understood by describing its response to an output voltage which has decreased from some desired regulated value. As the voltage across output terminals 241 and 242 decreases in value, a portion of this voltage tapped from the voltage divider 255 drives transistor 251 further into its conductivity range thereby increasing its collector-emitter current. The increased collector-emitter current is applied to input 261 of pulse delay circuit 260. This increased control current decreases the time delay which the pulse delay circuit 260 imposes upon the output pulse of winding 215. This reduced time delay reduces the length of time that the control winding 211 is open circuited by the silicon controlled rectifier 270. This in turn causes the duration of the output pulse across the secondary winding 213 to increase in value thereby raising the average value of the output voltage across the output terminals 241 and 242 to its desired voltage level. Conversely, a rising output voltage will reduce the collector-emitter current of transistor 251 and increase the time delay which the pulse delay circuit 260 imposes on the pulse output of the winding 215.

It is apparent from the foregoing that the necessary synchronization between the switching of the inverter circuit and the action of the feedback control is maintained by utilizing the delayed output of the winding 215 as the feedback signal (waveform $f$).

A starting circuit is required to initiate voltage regulation in the converter. Initially upon starting of the inverter circuit all of the input voltage is absorbed by the open circuited winding 211. The silicon controlled rectifier 270 is not activated until an output voltage across terminals 241 and 242 is developed. The diode 225 and the resistor 224 overcome this initial nonresponsive condition by establishing an initial source of current to activate the transistor 251. The pulse output of winding 215, as clipped by breakdown diode 217, is applied, via diode 225, to the parallel connected breakdown diode 252 and capacitor 253. The voltage developed across the capacitor 253 acts as an initial substitute for the voltage normally developed across the breakdown diode 252 and permits the feedback circuitry to begin functioning. After sufficient voltage is developed across the output terminals 241 and 242 the diode 225 becomes back-biased and the starting circuit is deactivated.

Figure 4:
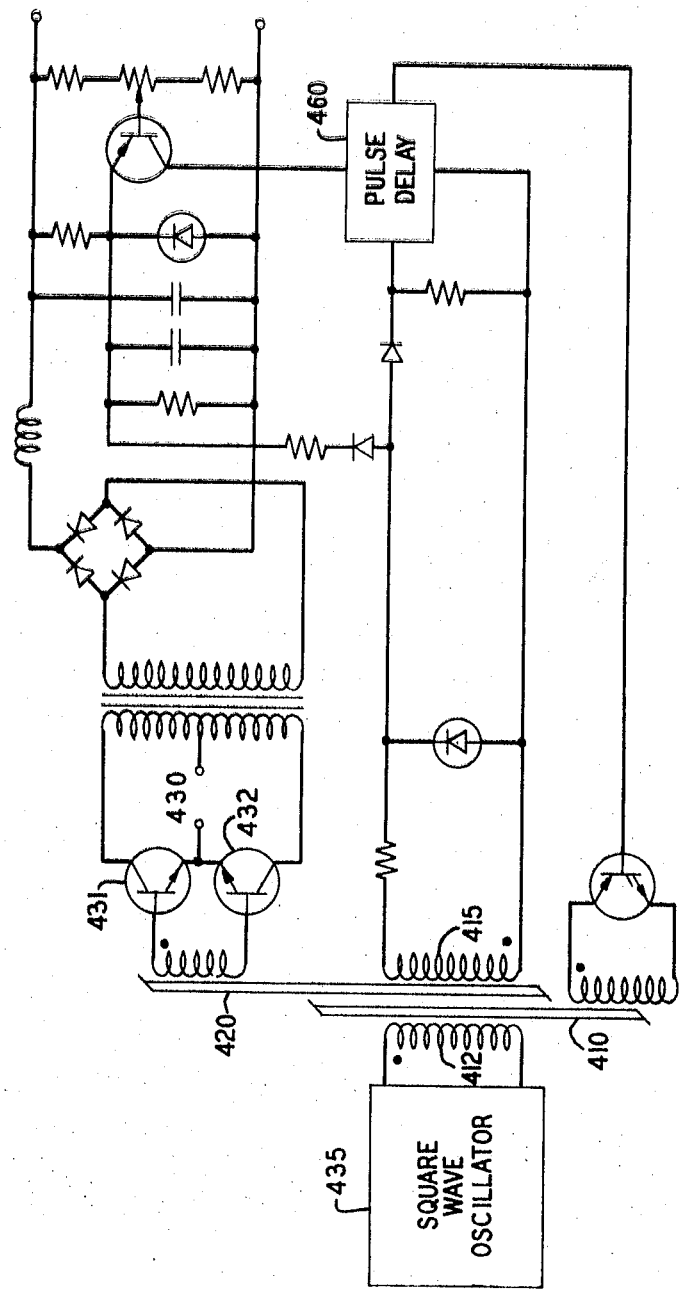
FIG. 4 is a schematic of a DC to DC converter utilizing a driven inverter and including a dual core transformer in the base drive circuit of the inverter.

A second version of the DC to DC converter utilizing flux controlled pulse width modulation is shown in FIG. 4. In this version the converter includes a dual core transformer in the base drive circuit of the switching transistors 431 and 432 of a driven inverter 430. The power is supplied by a square wave oscillator 435. The square wave output of the square wave oscillator 435 is impressed across the primary winding 412 which is coupled to both transformer cores 410 and 420. By means of winding 415, a feedback pulse signal is generated for application to the pulse delay circuit 460. The pulse delay circuit 460 delays this pulse signal in proportion to the magnitude of the output voltage as described above with reference to the feedback circuit in FIG. 2. The regulation operation proceeds in a manner which is identical to that described with reference to the converter circuit shown in FIG. 2.

What is claimed is:

1. A DC to DC converter comprising a first transformer core, a second transformer core, an input winding wound to encircle said first and second cores, an output winding wound to encircle said first core, a voltage monitoring circuit to monitor the voltage output across said output winding, a control winding wound to encircle said second core, a fourth winding wound to encircle both said first and second cores, a pulse delay circuit coupled to said fourth winding with its delay characteristics responsive to said voltage monitoring circuit, a switching device shunting said control winding and responsive to the pulse output of said pulse delay circuit, whereby said pulse output activates said switching device to short said control winding and enable the transmission of signals from said input winding to said output winding by permitting flux variations in said first transformer core and inhibiting flux variations in said second transformer core.

2. A DC to DC converter as defined in claim 1 wherein said second transformer core comprises a core having square loop magnetization properties and is designed to saturate during alternate half-cycles of periodic input signals applied to said input winding by having a volt-time capacity in excess of the volt-time product of periodic input signals applied to said input winding and said switching device comprises a controlled rectifier responsive to only one polarity of control signal supplied by said pulse delay circuit whereby said transmission of signals from said input winding to said output winding is controlled by said switching device only during alternate half-cycles of periodic input signals applied to said input winding and the said transmission of signals from said input winding to said output winding is controlled by saturation of said second transformer core during intervening half-cycles of periodic input signals applied to said input winding.

3. A DC to DC converter as defined in claim 1 wherein said voltage monitoring circuit comprises a reference voltage source energized by said output voltage and a voltage error detector to compare the reference voltage and the output voltage and a starting voltage circuit to supply a temporary reference voltage before an output voltage exists to energize said reference voltage source.

4. A DC to DC converter as defined in claim 3 wherein said starting voltage circuit comprises a capacitor shunting said reference voltage source and a charging path to supply energy from said fourth winding to said capacitor and means to disable said charging path when said reference voltage source becomes operative.

5. A DC to DC converter comprising a periodic voltage source to generate a periodic voltage having a particular volt-time product, a first transformer core having a square loop magnetization curve and a volt-time product capacity in excess of the volt-time product of said periodic voltage source, a second transformer core having a square loop magnetization curve and a volt-time product capacity in excess of the volt-time product of said periodic voltage source, a primary winding wound to encircle both said first and second transformer cores and connected to said periodic voltage source, said primary winding having a sufficient number of turns to limit flux excursion in said first and second transformer cores to a minor hysteresis loop, a secondary winding wound to encircle said first transformer core, a control winding wound to encircle said second transformer core, a fourth winding wound to encircle said first and second transformer cores, means to monitor the output voltage supplied by said secondary winding, signal delay means responsive to said means to monitor and connected to delay the signal output of said fourth winding, a controlled rectifier having its main conductive path connected in parallel with said control winding and including a control electrode connected to said signal delay means, whereby said controlled rectifier is responsive to control signals of one polarity from said signal delay means derived from the signal output of said fourth winding and shorts said control winding during alternate half-cycles of said periodic voltage source and said second transformer core saturates during the intervening half-cycles of said periodic voltage source.

6. A DC to DC converter as defined in claim 5 and including a full wave rectifier connected across said secondary winding, a pair of output terminals connected to said rectifier, said means to monitor the output voltage comprising a source of reference voltage comprising a breakdown diode energized by voltage across said output terminals, and a voltage error detector connected to and responsive to relative magnitudes of the voltage across said output terminals and said reference voltage, said voltage error detector generating an error signal and connected to control said signal delay means, said signal delay means delaying signals in proportion to the magnitude of said error signal.

7. A DC to DC converter as defined in claim 6 and including a starting circuit comprising a capacitor connected to said voltage error detector and across said breakdown diode and a capacitor charging path interconnecting said fourth winding to said capacitor and a diode to block conduction in said charging path by being biased when said breakdown diode become operative.

* * * * *